United States Patent [19]

Jones

[11] 4,213,570

[45] Jul. 22, 1980

[54] FOOD PROCESSOR WITH METERING DISPENSER

[75] Inventor: Barbara A. Jones, Saratoga, Calif.

[73] Assignee: Cuisinarts, Inc., Greenwich, Conn.

[21] Appl. No.: 955,133

[22] Filed: Oct. 26, 1978

[51] Int. Cl.² .................................................. B02C 18/22
[52] U.S. Cl. ......................................... 241/38; 81/3 R;
    241/282.1
[58] Field of Search ................. 241/38, 92, 199.12,
    241/282.1, 282; 366/150; 222/185; 141/324;
    81/3 R

[56] References Cited
U.S. PATENT DOCUMENTS

| | | | |
|---|---|---|---|
| 3,892,365 | 7/1975 | Verdun | 241/92 |
| 3,985,304 | 10/1976 | Sontheimer | 241/92 |
| 4,087,053 | 5/1978 | Voglesonger | 24/282.1 |
| 4,095,751 | 6/1978 | Artin | 241/92 X |
| 4,113,188 | 9/1978 | Belinkoff | 24/282.1 X |

Primary Examiner—Howard N. Goldberg
Attorney, Agent, or Firm—Parmelee, Johnson, Bollinger & Bramblett

[57] ABSTRACT

An improvement in a food processor of the type which includes a working bowl mountable on a base housing and enclosing rotatable food processing tools. The bowl includes a removable cover having a food receiving hopper therethrough. The improvement comprises a food pusher which is selectively insertable into the hopper and is in the form of an ingredient dispensing receptable with a dispensing opening for metering an ingredient from the receptacle into the bowl.

5 Claims, 3 Drawing Figures

FOOD PROCESSOR WITH METERING DISPENSER

BACKGROUND OF THE INVENTION

One of the most commercially important developments in the field of food technology is the food processor. These units are becoming increasingly popular in both home and institutional kitchens and efficiently perform a wide variety of tasks including slicing, chopping, grating, etc. of many different food items. In general, such food processors include a base housing enclosing a drive unit having a vertically extending drive shaft. Mounted upon the base housing is a working bowl which has a central well, or other liquid sealing arrangement, through which the drive shaft passes. Interchangeable rotating tools are supplied which normally include a central hub which is mountable upon the drive shaft. The tools are then rotatable within the bowl with the blades or other food processing components extend from the hub toward the side wall of the bowl. The top of the bowl is closed by a removable cover which carries a vertically extending hopper or feed tube through which food items are fed into the bowl. A pusher is normally supplied which is insertable into the hopper to advance food against the rotating tool. Examples of food processors of this general type will be found in the following United States patents:

| Patent No. | Issued    | Inventor          |
|------------|-----------|-------------------|
| 3,892,365  | July 1/75 | Pierre Verdun     |
| 3,985,304  | Oct.12/76 | Carl G. Sontheimer|

It is often desired to introduce an ingredient in metered quantities to a food during the period of processing. It would be desirable, for example, to add a salad dressing to a salad in a food processor during the time the salad is being shredded or mixed. Similarly, milk could most advantageously be added to whipped potatoes while they are in the process of being whipped. In prior food processors, it has been awkward to add such an ingredient, and so much an ingredient has been dumped all at once into the working bowl by temporarily stopping the machine and removing the cover or else has been introduced into the bowl along with the other ingredients at the beginning of the food processing operation.

In fact, in many instances liquid or comminuted solid ingredients may be best added to foods while they are in the process of being macerated, chopped, or otherwise worked. Furthermore, this can be most efficiently accomplished by allowing the additive to enter the food in a slow, but steady, metered flow. It is a primary object of the present invention to provide a rotary food processor with a conveniently usable metering dispenser. Other objects are to provide such a dispenser without complicating the processor by adding parts thereto; and to provide such a dispenser at substantially no additional expense. Other objects, features, and advantages will be apparent from the following description and appended claims.

SUMMARY OF THE INVENTION

An improvement to a food processor of the type which includes a base housing, a drive shaft extending vertically upward from the housing, and a working bowl positionable on the housing and having a central well, or other liquid sealing arrangement, surrounding the drive shaft. A plurality of rotary food processing tools are mountable on the drive shaft for rotation within the bowl and a cover for the bowl has a food receiving hopper or feed tube opening downwardly through the cover. The improvement comprises a combination metering dispenser and food pusher in the form of an additive-containable receptacle having a side wall slidably engageable within the hopper and a bottom wall. The bottom wall defines a dispensing opening therethrough for metering an ingredient from the receptacle into the bowl.

DESCRIPTION OF THE PREFERRED EMBODIMENT

Figure 1:
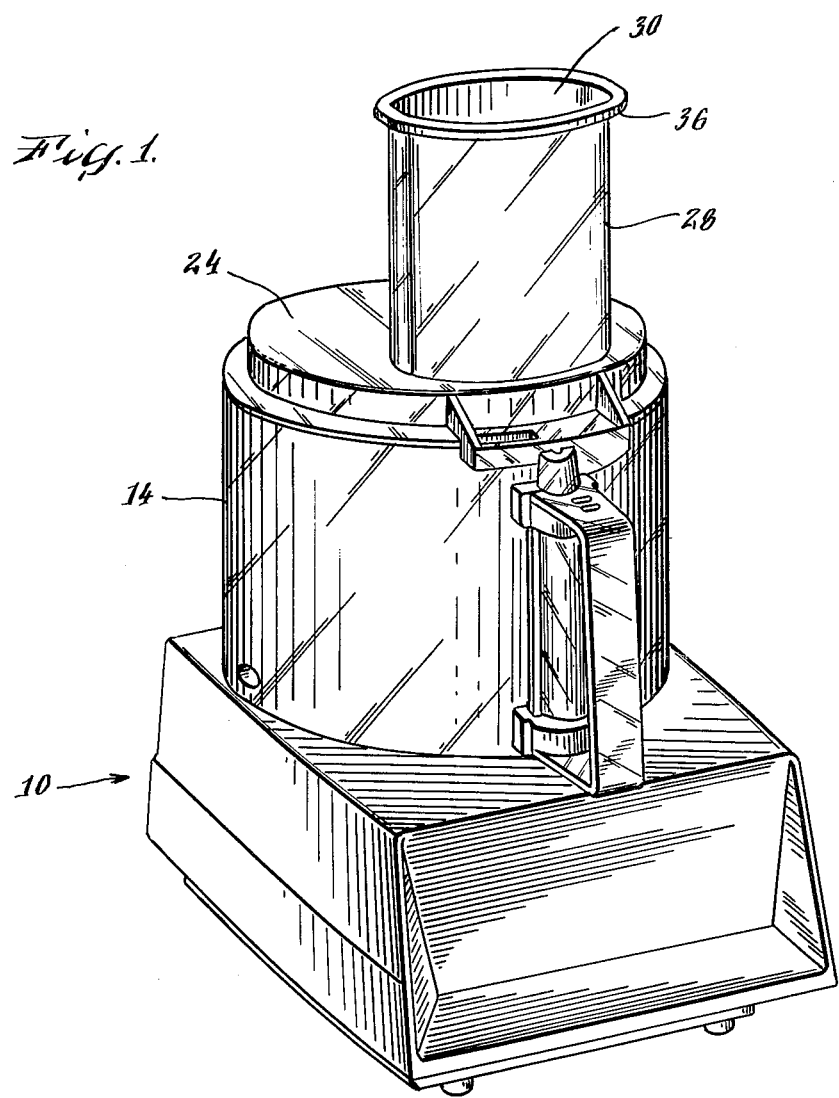
FIG. 1 is a perspective view of a food processor in accordance with this invention.
Figure 2:
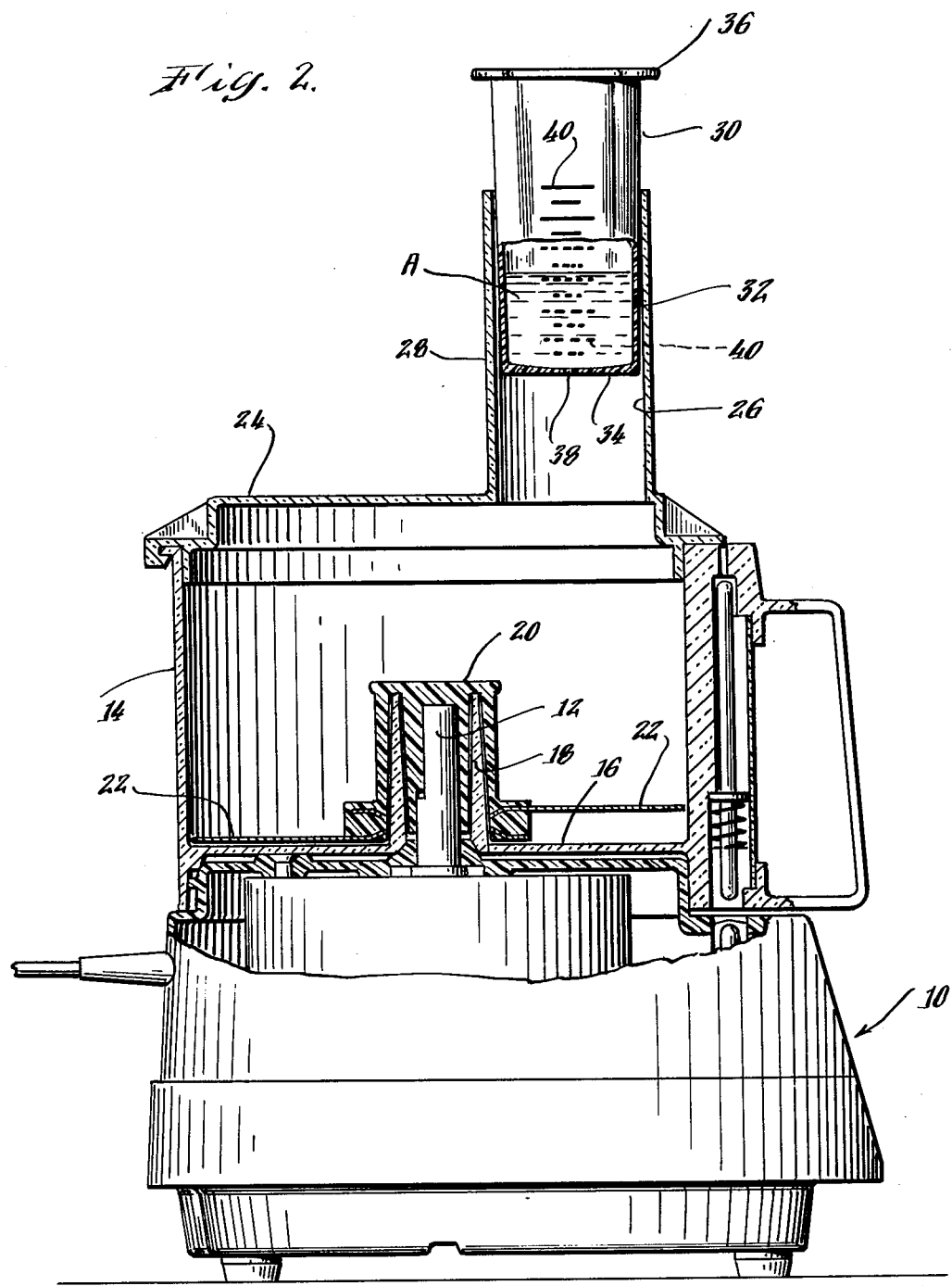
FIG. 2 is a side view of the processor of FIG. 1, a portion thereof being broken away to illustrate its internal construction.

With particular reference to the drawings, there is illustrated in FIGS. 1 and 2 a food processor including a base housing 10. Extending upwardly from the housing 10 is a drive shaft 12, which is driven by an electric motor (not shown) enclosed within the housing. Mounted upon housing 10 is substantially cylindrical working bowl 14 which has an open top and a bottom 16 with a vertically extending central cylindrical well 18 surrounding the drive shaft 12. The purpose of this well 18 is to provide a barrier for preventing liquid from spilling out of the bowl through the aperture in the bottom 19 which accommodates the tool drive shaft 12. It is to be understood that other liquid sealing arrangements may be provided around the shaft 12 for sealing the bottom of the bowl.

Removably mounted for rotation on the drive shaft 12 within the well 18 is a tool hub 20 from which extend one or more blades 22 or other tools which serve to process the food within the bowl. It will be understood that the hub 20 and tools 22 illustrated in FIG. 2 are merely exemplary. Many different types of tools may be selectively engaged with the drive shaft 12 to perform the desired operations. Such operations may be, for example, grating, slicing, chopping, whipping, pureeing, etc.

Closing the top of the bowl 14 is a removable cover 24 which is formed with a radially offset opening 26 enclosed by a vertically extending food receiving hopper or feed tube 28. A cup-shaped food pusher 30 is normally employed to push food items through the hopper and into engagement with the rotating tools within the bowl. Being cup-shaped, the pusher 30 includes a side wall 32 which is slidably advanceable into the hopper 28 and a substantially planar bottom 34. About its upper edge, it is provided with a radially extending abutment rim 36 which is adapted to rest upon the open, upper end of the hopper 28, serving as a stop when the food pusher has been fully inserted. The rim abutment also serves as a handle for the user. Instead of a continuous rim, the abutment 36 may be formed by a plurality of lugs or protrusions for providing a hand grip and also acting as stops for engaging the hopper.

The food pusher 30 of this invention also advantageously functions as an additive metering dispenser. To this end, the bottom wall 34 defines a metering orifice 38. In order to function as a dispenser, there is placed within the cup-shaped food pusher 30 the desired quantity of an ingredient A which may be, as previously suggested, salad dressing, milk, melted butter, salt, flour, spice, or any other desired additive. The additive, whatever it may be, is dispensed through the orifice 38 into the contents of the bowl in the form of drops of a thin stream. The pusher may be simultaneously used to push food through the hopper or, alternatively, may simply be suspended in the hopper for use solely in dispensing. The orifice size may be selected to accommodate the particular additive. An orifice in the range of 1/16"-⅛" diameter, depending upon the viscosity of the additive and the size of the machine, has been found to be effective.

Figure 3:
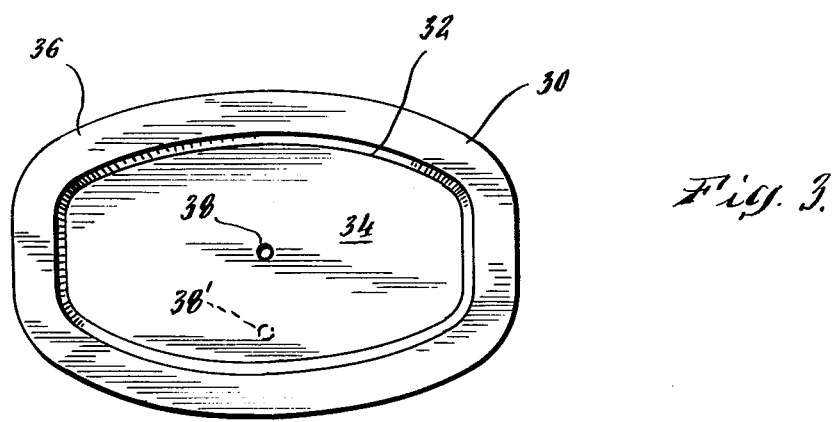
FIG. 3 is an enlarged top view of the combination liquid metering dispenser and food pusher.

It will also be understood that the orifice 38 need not be centrally positioned in the bottom wall of the food pusher 30 but may be radially offset as shown, for example, by dotted lines 38' in FIG. 3. The advantage of offsetting the orifice in this fashion is that, by reversing the position of the food pusher 30 in the hopper 28 by 180°, the additive may be dispensed either closer or farther from the hub of the tool, thereby changing the distribution pattern by virtue of its contacting a radial portion of the tools having a greater or lesser circumferential velocity. The inside surface of the bottom wall 34 slopes downwardly and inwardly toward the orifice 38 or 38'.

If desired, the food pusher-dispenser 30 may be made of rigid transparent plastic material and may include index marks or graduations 40 in its side wall 32. The user temporarily places a thumb or finger for closing the metering orifice 38 while filling up to the desired level as shown by the graduated scale 40.

It is believed that the many advantages of this invention will now be apparent to those skilled in the art. It will also be apparent that the number of variations and modifications may be made therein without departing from its spirit and scope. Accordingly, the foregoing description is to be construed as illustrative only. This invention is limited only by the scope of the following claims.

I claim:

1. In a food processor of the type including a base housing, a tool drive shaft extending vertically upward and being drivable from said housing, a working bowl positionable on said housing and adapted to have said drive shaft extending upwardly therein, a plurality of rotary food processing tools mountable on said drive shaft for rotating within said bowl, and a cover for said bowl having a food-receiving hopper opening downwardly through the cover, the improvement which comprises: a combination metering dispenser and food pusher in the form of an ingredient-containable receptacle having at least a sidewall slidably engageable within said hopper and a bottom wall, said bottom wall defining a dispensing opening therethrough for metering an ingredient from said receptacle into said bowl.

2. The food pusher-metering dispenser of claim 1, wherein said dispensing opening is substantially centrally located in the bottom wall of said receptacle.

3. The food pusher-metering dispenser of claim 1, wherein said dispensing opening is radially offset from the center of said bottom wall.

4. The food pusher-metering dispenser of claim 2 or 3, wherein the diameter of said dispensing opening is in the range of 1/16 to ⅛ inch.

5. The food pusher-metering dispenser of claim 2 or 3, wherein the inside surface of the bottom wall slopes downwardly and inwardly toward said opening.

* * * * *